United States Patent [19]

Barber

[11] E Re. 31,008

[45] Reissued Aug. 10, 1982

[54] DAMPENED RAILWAY CAR TRUCK

[75] Inventor: Franklin D. Barber, Flossmoor, Ill.

[73] Assignee: Standard Car Truck Company, Chicago, Ill.

[21] Appl. No.: 112,713

[22] Filed: Jan. 31, 1980

Related U.S. Patent Documents

Reissue of:

[64] Patent No.: 3,714,905
Issued: Feb. 6, 1973
Appl. No.: 115,184
Filed: Feb. 16, 1971

[51] Int. Cl.[3] ..... B61F 5/06; B61F 5/12; B61F 5/24

[52] U.S. Cl. ..... 105/197 DB; 105/206 R; 267/9 A

[58] Field of Search ..... 105/197 D, 197 DB, 206; 267/9 A

[56] References Cited

U.S. PATENT DOCUMENTS

| | | | |
|---|---|---|---|
| 2,159,138 | 5/1939 | Duryea | 105/197 D |
| 2,169,715 | 8/1939 | Webb | 105/197 DB |
| 2,283,332 | 5/1942 | Light | 105/197 DB |
| 2,338,857 | 1/1944 | Light | 105/197 DB |
| 2,375,206 | 5/1945 | Baselt et al. | 105/197 D |
| 2,375,207 | 5/1945 | Cottrell | 105/197 DB |
| 2,434,838 | 1/1948 | Cottrell | 105/197 DB |
| 2,551,064 | 5/1951 | Spenner | 105/197 D |
| 2,571,519 | 10/1951 | Barber | 105/197 DB |
| 2,574,348 | 11/1951 | Orr et al. | 105/197 DB |
| 2,687,100 | 8/1954 | Dath | 105/197 DB |
| 2,702,512 | 2/1955 | Maatman | 105/197 DB |
| 2,986,101 | 5/1961 | Tack et al. | 105/197 DB |
| 3,339,498 | 9/1967 | Weber | 105/197 D |
| 3,358,614 | 12/1967 | Barber | 105/197 DB |
| 3,408,955 | 11/1968 | Barber | 105/197 DB |
| 3,714,905 | 2/1973 | Barber | 105/197 DB |
| 4,244,298 | 1/1981 | Hawthorne et al. | 105/197 DB |

FOREIGN PATENT DOCUMENTS

| | | | |
|---|---|---|---|
| 484517 | 7/1952 | Canada | 105/197 DB |
| 511142 | 3/1953 | Canada | 105/197 DB |
| 775351 | 1/1968 | Canada | 105/197 D |
| 957564 | 11/1968 | Canada | 105/197 DB |

*Primary Examiner*—Joseph F. Peters, Jr.
*Assistant Examiner*—Howard Beltran
*Attorney, Agent, or Firm*—Kinzer, Plyer, Dorn & McEachran

[57] ABSTRACT

A dampened bolster and side frame assembly for a railway truck including widened lands on the side frame and a plurality of spaced wedges on each side of the bolster and on opposite sides of the frame center line.

5 Claims, 3 Drawing Figures

DAMPENED RAILWAY CAR TRUCK

Matter enclosed in heavy brackets [ ] appears in the original patent but forms no part of this reissue specification; matter printed in italics indicates the additions made by reissue.

SUMMARY OF THE INVENTION

This invention relates to railway car truck assemblies and particularly to a truck assembly having self-squaring means.

In the operation of a railway car various forces cause vibrations and other motion due to entry into curved track or traversing uneven track and the like and tend to urge the truck assembly into a parallelopipedal configuration, i.e., to urge one side frame in advance of the other and consequently to position the bolster out of perpendicular relation to the side frames. Such nonsquareness contributes to wheel wear. Hence it is one purpose of the invention to provide a railway car truck assembly including means yieldingly urging the assembly toward a square relationship.

Another purpose is to provide a self-squaring railway truck structure wherein the elements are yieldingly urged toward a square relationship at a plurality of points.

Another purpose is to provide a railway truck structure wherein the geometry of resiliently supported wedges is such that when the truck is forced out of square the wedges will adjust to resiliently restrain against a distorted relationship of the truck members and the supporting wedge springs will tend to restore the wedges, through equilibrium of the several spring forces, to the required even elevation for again holding the truck square.

Another purpose is to provide a bolster supporting spring assembly effective to permit the employment of self-squaring elements while providing desired bolster support.

Other purposes may appear from time to time during the course of the specification and claims.

BRIEF DESCRIPTION OF THE DISCLOSURE

The invention is illustrated more or less diagrammatically in the accompanying drawings wherein.

Like parts are indicated by like numerals throughout the specification and drawings.

DESCRIPTION OF THE PREFERRED EMBODIMENT

Figure 1:
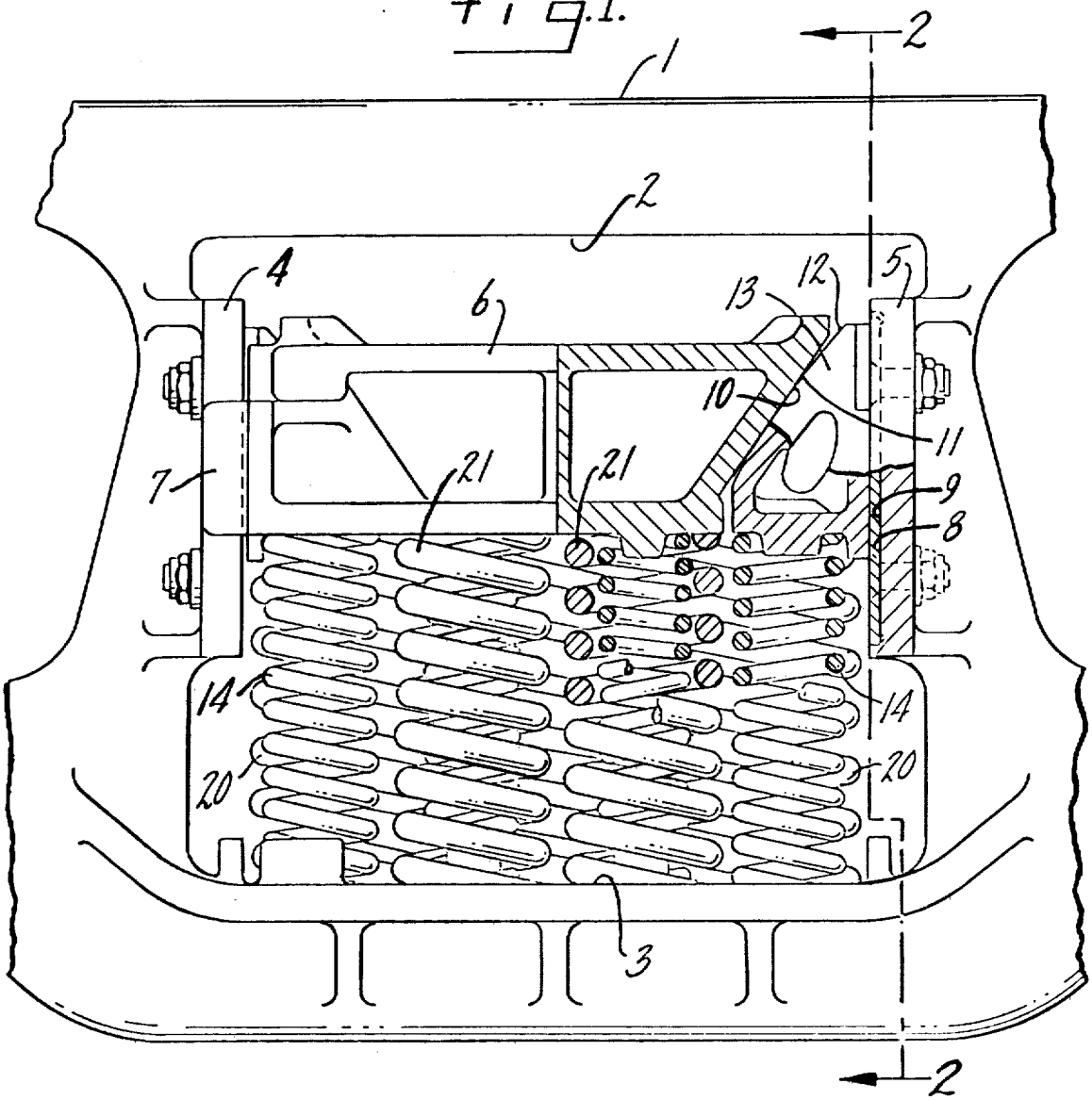
FIG. 1 is a side view with parts in cross section.

Since railway truck side frames and bolsters are well known to those skilled in the art, only those portions necessary for an understanding of the present invention are, for clarity and simplicity, illustrated herein. Hence the numeral 1 generally designates one side frame of a truck assembly. The window 2 is formed in the side frame. The floor 3 forms the lowermost boundary of the window 2. The opposite side walls of the window 2 are widened or expanded laterally of the frame 1, as indicated at 4, 5, the widened portions 4, 5 extending in opposite directions from the frame 1 and laterally thereof. Beneath the portions 4, 5 the side walls are of greater separation to permit passage of the bolster end portion 6 through the window 2 and subsequent raising thereof to the position shown in the drawings. Bolster end portion 6 includes spaced side flanges 7 spaced sufficiently apart to receive therebetween, on each side of bolster and 6, the widened side wall portions 4, 5. Wear plates 8 are received in pockets 9 formed in the opposed faces of portions 4, 5, a pair of plates 8 being spaced on opposite sides of the linear center line of frame 1 on each of the portions 4, 5.

The opposite side walls of the bolster end 6 each have formed therein a pair of spaced pockets 10. Each pocket 10 has an inwardly, downwardly sloping wall 11 against which the similarly inclined wedge surface 12 of a wedge 13 is urged by a wedge spring 14. Each wedge 13 has a vertically disposed wear surface 15 provided for engagement with the opposed face of a wear plate 8.

Thus each end of the railway truck bolster has formed therein four wedge pockets, two on each side of each bolster end portion.

Figure 3:
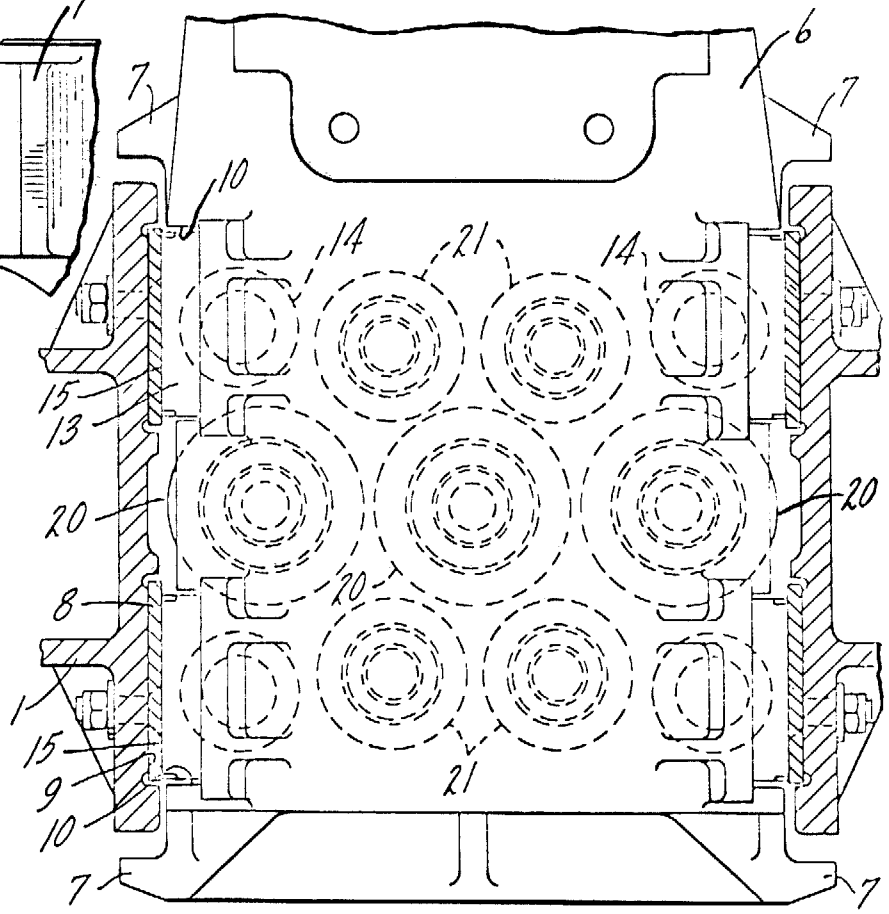
FIG. 3 is a top view with parts in cross section.
Figure 2:
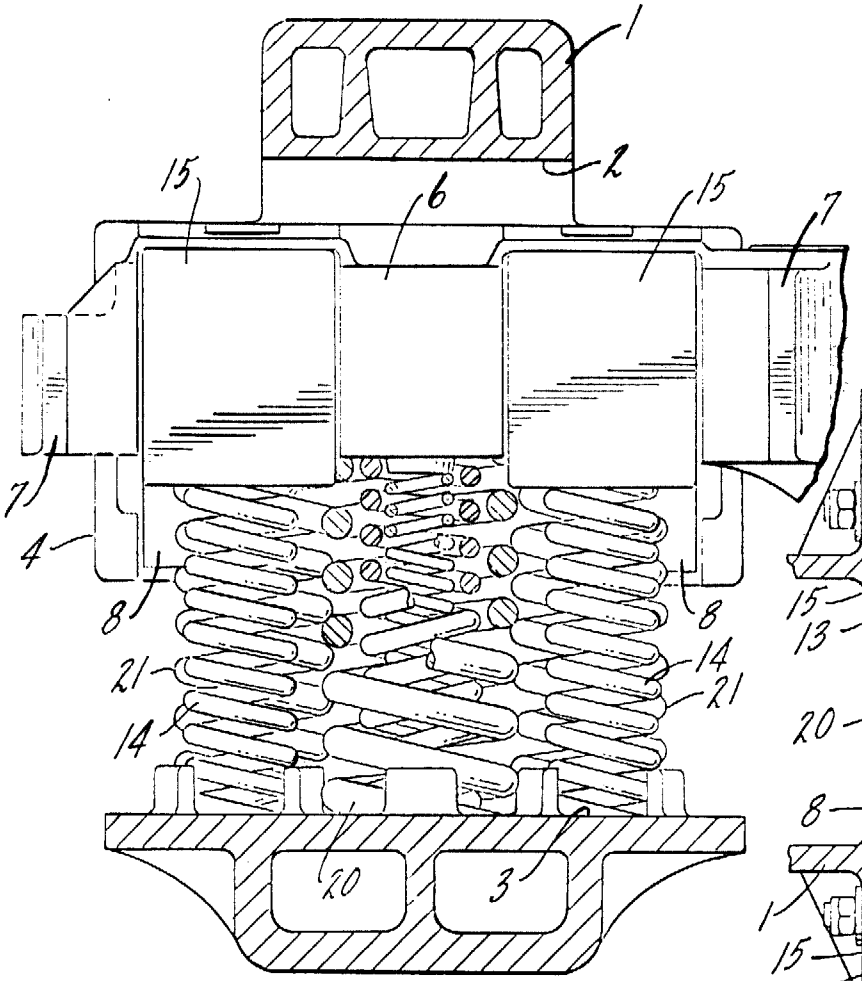
FIG. 2 is an end view taken on line 2—2 of FIG. 1 with parts in cross section.

Each bolster end portion 6 is of full unbroken width between each pair of pockets 10 for contact by the undersurface thereof with a set of spring assemblies 20 arranged on floor 3 and along the linear center line of side frame 1. Each of the assemblies 20 comprises a plurality of springs of varying strength. Between each set of oppositely disposed wedges 13 and the springs 14 in support thereof, spring assemblies 21 are positioned beneath the bolster and 6. The assemblies 21 are also formed of a plurality of springs of varying strength. Thus, as may be best seen in FIG. 3, the bolster is directly carried upon the springs 20, 21 and indirectly by the wedges 13 which are carried upon the springs 14. It will be realized that the grouping, arrangement and size of springs supporting the bolster may be varied in response to car capacity and desired spring travel.

The use and operation of the invention are as follows:

As the railway truck is operated the spring grouping formed of assemblies 20, 21, as well as springs 14 and wedges 13, effectively provide desirable, balanced, yielding resistance to relative vertical movement between each bolster end 6 and its associated side frame. At the same time the wedge means 13 yieldingly urge the bolster into square relationship with the side frames 1. In the form of the present invention two such wedge means in spaced relation and on opposite sides of the linear center line of frame 1 are provided for urging the bolster end 6 in both directions linearly of the frame 1. Thus forces tending to urge the bolster out of square relation with the frames 1 will be resisted by four of the wedge assemblies above described, two on one side of one bolster end and two on the opposite side of the opposite bolster end (not shown). Since the wedge means 13 are yieldingly urged into position, it will be realized that extensive or abnormally strong forces tending to urge the truck out of square relationship will be accommodated and undue strains otherwise transmitted to the side frames and bolster by such abnormal forces can be avoided. At the same time, normal forces tending to nonsquareness will be overcome by the number and positioning of the plurality of wedge means 13.

The embodiments of the invention in which an exclusive property or privilege is claimed are defined as follows:

1. A railway truck assembly including a pair of parallel side frames, a window in each of said side frames, a bolster extending perpendicularly between said side frames and having each of its opposite ends received in one of said windows, each of said windows having widened side walls, said side walls having portions extending *in the same plane and* in opposite directions laterally of their associated side frame, said side walls *and planar extending portions,* paralleling each other and carrying a plurality of wear plates, *with each wear plate having its planar engaging surface parallel with the planar side wall and extending portions,* said wear plates being positioned on opposite sides of the linear center line of their associated side frame, each of said wear plates having a portion positioned inwardly of said extending side wall portions, each of said bolster end portions having a plurality of spaced pockets positioned in its sides, each of said pockets having a wall inclined downwardly away from and opposed to one of said wear plates, an individual wedge element received in each of said pockets, each of said wedge elements engaging the inclined wall of its associated pocket and engaging the wear plate opposed to its associated pocket *the entire engaging surfaces of the respective wear plates and wedge elements being in substantially the same lateral plane,* and yielding means for each of said wedge elements, each said yielding means being positioned in said window and urging its associated wedge element toward its associated pocket.

2. The structure of claim 1 characterized by and including a spring grouping positioned in each said window and beneath each said bolster end portion to resist movement of each said bolster portion toward the bottom of each said window, said spring grouping comprising a first spring group formed of a plurality of spring assemblies and positioned along the linear center line of its associated window and a second spring group formed of a plurality of spring assemblies positioned on opposite sides of said first spring group.

3. In a railway truck bolster and side frame assembly, a side frame having a window, a bolster having an end portion penetrating said window, said side frame having parallel *and planar* window side wall portions extending *only* laterally in opposite directions from the linear center line of said side frame, a first pair of wedge means engaging one side of said bolster end and one of said side wall portions, a second pair of wedge means engaging the opposite side of said bolster end and the other of said side wall portions, said wedge means of said first pair being positioned on opposite sides of the linear center line of said frame, said wedge means of said second pair being positioned on opposite sides of said center line of said side frame, each of said wedge means of said first pair being opposite and aligned with a wedge means of said second pair *the entire engaging surfaces of the respective and engaging wedge means and side frame being in substantially the same plane and applying only compressive forces perpendicular to the bolster center line and only frictional shear forces parallel to the bolster center line upon the opposing surfaces of said side frame.*

4. A railway side frame and bolster assembly including a side frame having a window, the vertical side walls of said window including parallel *and planar* portions extending laterally in opposite directions from the longitudinal center line of said side frame and substantially beyond the main body of said side frame, said bolster having an end portion penetrating said window and wedge means engaging the opposite sides of said bolster end portion and said laterally extending side wall portions on opposite sides of the longitudinal center line of said side frame *with the entire engaging surfaces of said wedge means and said laterally and planar extending side wall portions being in substantially the same plane.*

5. The structure of claim 4 characterized by and including a horizontal bottom wall defining the bottom of said window, said bottom wall extending between said side walls and laterally in opposite directions from the longitudinal center line of said side frame and substantially beyond the main body of said side frame, first spring means carried on said bottom wall and engaging the undersurface of said bolster end portion and second spring means carried on said bottom wall and engaging the undersurface of said wedge means.

* * * * *

Disclaimer

Re. 31,008.—*Franklin D. Barber,* Flossmoor, Ill., deceased, by a Corp. of N.J., Standard Car Truck Co., Chicago, Ill. DAMPENED RAILWAY CAR TRUCK. Patent dated Aug. 10, 1982. Disclaimer filed Oct. 17, 1983, by the assignee, *Standard Car Truck Co.*

Hereby enters this disclaimer to claim 3 of said patent.

[*Official Gazette January 17, 1984.*]